United States Patent
Nieddu

(10) Patent No.: US 10,190,525 B2
(45) Date of Patent: Jan. 29, 2019

(54) METHOD OF CALCULATING AN ANGULAR POSITION OF A CRANKSHAFT DURING A FUEL INJECTION EVENT

(71) Applicant: GM GLOBAL TECHNOLOGY OPERATIONS LLC, Detroit, MI (US)

(72) Inventor: Stefano Nieddu, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 186 days.

(21) Appl. No.: 15/434,134

(22) Filed: Feb. 16, 2017

(65) Prior Publication Data

US 2018/0230933 A1   Aug. 16, 2018

(51) Int. Cl.
*F02D 41/00*      (2006.01)
*F02D 41/40*      (2006.01)
*F02D 41/38*      (2006.01)

(52) U.S. Cl.
CPC ......... *F02D 41/401* (2013.01); *F02D 41/009* (2013.01); *F02D 41/3809* (2013.01); *F02D 2041/389* (2013.01); *F02D 2200/0602* (2013.01)

(58) Field of Classification Search
CPC .. F02D 41/401; F02D 41/009; F02D 41/3809; F02D 2200/0602; F02D 2041/389
See application file for complete search history.

(56) References Cited

U.S. PATENT DOCUMENTS

| 5,771,861 A * | 6/1998 | Musser | F02D 41/1401 123/357 |
|---|---|---|---|
| 2011/0226214 A1* | 9/2011 | Ogata | F02B 23/104 123/299 |
| 2016/0215708 A1* | 7/2016 | Nieddu | F02D 41/2467 |

* cited by examiner

*Primary Examiner* — Hieu T Vo
*Assistant Examiner* — Sherman Manley
(74) *Attorney, Agent, or Firm* — Quinn IP Law

(57) ABSTRACT

A method of calculating an angular position of a crankshaft at the occurrence of a fuel injection event includes integrating a first polynomial function, and integrating a second polynomial function. The integrated second polynomial function is then divided by the integrated first polynomial function to calculate the angular position of the crankshaft at the occurrence of the fuel injection event. The calculated angular position of the crankshaft at the occurrence of the fuel injection event may then be correlated to an absolute angular position of the crankshaft, relative to a Top Dead Center position of the crankshaft. The calculated position of the crankshaft at the occurrence of the fuel injection event may be used to adjust the injection timing of future fuel injection events.

20 Claims, 2 Drawing Sheets

METHOD OF CALCULATING AN ANGULAR POSITION OF A CRANKSHAFT DURING A FUEL INJECTION EVENT

INTRODUCTION

The disclosure generally relates to a method of controlling an internal combustion engine of a vehicle, and more specifically to a method of calculating an angular position of a crankshaft at the occurrence of a fuel injection event.

Optimum operation of an internal combustion engine requires that the fuel be injected into the cylinder bore when the crankshaft is positioned at a specific rotational angle, thereby properly positioning a piston within the cylinder bore. An engine controller sends a control signal to a fuel injector, which in turn injects the fuel into the cylinder bore, i.e., a fuel injection event. There is a time delay between the moment the control signal is sent to the fuel injector, and the moment at which the fuel injector injects the fuel into the cylinder bore. This time delay changes as the fuel injector wears. In order to compensate for the change in the time delay, the timing of the fuel injection signal must be adjusted. The angular position of the crankshaft at the occurrence of a fuel injection event is be calculated in order for the engine controller to determine when and how much to adjust the timing of the fuel injection signal.

SUMMARY

A method of controlling an internal combustion engine is provided. The method includes calculating an angular position of a crankshaft of the internal combustion engine at the occurrence of a previous fuel injection event. An engine controller calculates the angular position of the crankshaft from the equation $$\gamma_{inj} = \frac{L_2}{L_1},$$

wherein $\gamma_{inj}$ is the angular position of the crankshaft at the occurrence of the previous fuel injection event, $L_2 = \int_0^{2\pi} P(\theta) \cdot (3\theta^2 - 4\pi\theta) d\theta$, $L_1 = \int_0^{2\pi} P(\theta) \cdot (2\theta - 2\pi) d\theta$, $P(\theta)$ is a fuel pressure data stream within a fuel rail of the internal combustion engine relative to the angular position of the crankshaft during the previous fuel injection event, and $\theta$ is the angular position of the crankshaft. A fuel injection timing of a future fuel injection event is adjusted, with the engine controller, based on the calculated angular position of the crankshaft at the occurrence of the previous fuel injection event. The injection timing of the future fuel injection event is adjusted so that the future fuel injection event occurs at a desired angular position of the crankshaft.

In one aspect of the method of controlling the internal combustion engine, the fuel pressure within the fuel rail of the internal combustion engine is continuously sensed during rotation of the crankshaft, in order to define the fuel pressure data stream.

In another aspect of the method of controlling the internal combustion engine, the engine controller identifies a pressure drop in the fuel pressure data stream. The engine controller further defines a period start position in the fuel pressure data stream, and a period end position in the fuel pressure data stream. The period start position is defined to occur prior to the identified pressure drop. The fuel pressure data stream maintains a substantially constant pre-injection fuel pressure between the period start position and the identified pressure drop in the fuel pressure data stream. The period end position is defined to occur subsequent to the identified pressure drop. The fuel pressure data stream maintains a substantially constant post-injection fuel pressure between the identified pressure drop in the fuel pressure data stream and the period end position.

In another aspect of the method of controlling the internal combustion engine, the engine controller correlates the calculated angular position of the crankshaft at the occurrence of the previous fuel injection event to an absolute position of the crankshaft during an engine cycle, relative to a Top Dead Center (TDC) position of the crankshaft. Correlating the calculated angular position of the crankshaft to the absolute position of the crankshaft includes calculating the absolute angular position of the crankshaft at the occurrence of the previous fuel injection event from the equation:

$$\gamma_{abs} = \gamma_{inj}\left(\frac{z}{2\pi}\right) + \gamma_{offset},$$

wherein $\gamma_{abs}$ is the absolute position of the crankshaft at the occurrence of the previous fuel injection event, $\gamma_{inj}$ is the calculated angular position of the crankshaft at the occurrence of the previous fuel injection event, z=angular rotation of the crankshaft that occurs between the period start position and the period end position, and $\gamma_{offset}$ is the angular rotation of the crankshaft from the TDC position of the crankshaft and the period start position of the fuel pressure data stream.

A method of calculating an angular position of a crankshaft at the occurrence of a fuel injection event is also provided. The method includes integrating a first polynomial function $L_1 = \int_0^{2\pi} P(\theta) \cdot (2\theta - 2\pi) d\theta$, and integrating a second polynomial function $L_2 = \int_0^{2\pi} P(\theta) \cdot (3\theta^2 - 4\pi\theta) d\theta$. $P(\theta)$ is defined as a fuel pressure data stream within a fuel rail of the internal combustion engine relative to the angular position of the crankshaft during the previous fuel injection event, and $\theta$ is defined as the angular position of the crankshaft. The integrated second polynomial function is then divided by the integrated first polynomial function to calculate the angular position of the crankshaft at the occurrence of the fuel injection event.

In one aspect of the method of calculating the angular position of the crankshaft, the fuel pressure within the fuel rail of an internal combustion engine is continuously sensed during rotation of the crankshaft to define the fuel pressure data stream.

In another aspect of the method of calculating the angular position of the crankshaft, a pressure drop in the fuel pressure data stream is identified. A period start position in the fuel pressure data stream is defined. The period start position occurs prior to the identified pressure drop. The fuel pressure data stream maintains a substantially constant pre-injection fuel pressure between the period start position and the identified pressure drop in the fuel pressure data stream. The period start position in the fuel pressure data stream is the lower limit of the integration of the first and second polynomial functions, and is defined to equal zero for the integration of the first and second polynomial functions. A period end position in the fuel pressure data stream is defined. The period end position occurs subsequent to the identified pressure drop. The fuel pressure data stream maintains a substantially constant post-injection fuel pressure between the identified pressure drop in the fuel pressure data stream and the period end position. The period end position in the fuel pressure data stream is the upper limit of the integration of the first and second polynomial functions, and is defined to equal $2\pi$ for the integration of the first and second polynomial functions.

In another aspect of the method of calculating the angular position of the crankshaft, the calculated angular position of the crankshaft at the occurrence of the fuel injection event is correlated to an absolute position of the crankshaft during an engine cycle, relative to a Top Dead Center (TDC) position of the crankshaft. Correlating the calculated angular position of the crankshaft to the absolute position of the crankshaft includes calculating the absolute angular position of the crankshaft at the occurrence of the previous fuel injection event from the equation:

$$\gamma_{abs} = \gamma_{inj}\left(\frac{z}{2\pi}\right) + \gamma_{offset},$$

wherein $\gamma_{abs}$ is the absolute position of the crankshaft at the occurrence of the fuel injection event, $\gamma_{inj}$ is the calculated angular position of the crankshaft at the occurrence of the previous fuel injection event, z=angular rotation of the crankshaft that occurs between the period start position and the period end position, and $\gamma_{offset}$ is the angular rotation of the crankshaft from the TDC position of the crankshaft and the period start position of the fuel pressure data stream.

A vehicle is also provided. The vehicle includes an internal combustion engine having a plurality of cylinders, and a crankshaft that is rotatable about a crank axis. A fuel rail is operable to supply pressurized fuel to each of the plurality of cylinders. An engine controller controls the operation of the internal combustion engine. The engine controller includes a processor and a tangible, non-transitory memory, on which is recorded computer-executable instructions, including a crankshaft angular position calculation algorithm. The processor is operable to execute the crankshaft angular position calculation algorithm to calculate an angular position of the crankshaft at the occurrence of a fuel injection event, from the equation $$\gamma_{inj} = \frac{L_2}{L_1},$$

wherein $\gamma_{inj}$ is the angular position of the crankshaft at the occurrence of the previous fuel injection event, $L_2 = \int_0^{2\pi} P(\theta) \cdot (3\theta^2 - 4\pi\theta) d\theta$, $L_1 = \int_0^{2\pi} P(\theta) \cdot (2\theta - 2\pi) d\theta$, $P(\theta)$ is a fuel pressure data stream within a fuel rail of the internal combustion engine relative to the angular position of the crankshaft during the previous fuel injection event, and $\theta$ is the angular position of the crankshaft.

In one aspect of the vehicle, the processor is operable to execute the crankshaft angular position calculation algorithm to adjust a fuel injection timing of a future fuel injection event, based on the calculated angular position of the crankshaft at the occurrence of the previous fuel injection event, so that the future fuel injection event occurs at a desired angular position of the crankshaft.

In another aspect of the vehicle, the processor is operable to execute the crankshaft angular position calculation algorithm to identify a pressure drop in the fuel pressure data stream. The processor may then define a period start position in the fuel pressure data stream prior to the identified pressure drop, and a period end position in the fuel pressure data stream subsequent to the identified pressure drop. The fuel pressure data stream maintains a substantially constant pre-injection fuel pressure between the period start position and the identified pressure drop in the fuel pressure data stream, The fuel pressure data stream maintains a substantially constant post-injection fuel pressure between the identified pressure drop in the fuel pressure data stream and the period end position.

In another aspect of the vehicle, the processor is operable to execute the crankshaft angular position calculation algorithm to calculate an absolute angular position of the crankshaft at the occurrence of the previous fuel injection event, relative to a Top Dead Center (TDC) position of the crankshaft. The processor calculates the absolute angular position of the crankshaft from the equation:

$$\gamma_{abs} = \gamma_{inj}\left(\frac{z}{2\pi}\right) + \gamma_{offset},$$

wherein $\gamma_{abs}$ is the absolute position of the crankshaft at the occurrence of the previous fuel injection event, $\gamma_{inj}$ is the calculated angular position of the crankshaft at the occurrence of the previous fuel injection event, z=angular rotation of the crankshaft that occurs between the period start position and the period end position, and $\gamma_{offset}$ is the angular rotation of the crankshaft from the TDC position of the crankshaft and the period start position of the fuel pressure data stream.

Accordingly, the method of calculating the angular position of the crankshaft at the occurrence of a fuel injection event enables the engine controller to adjust the timing of the fuel injection event so that the fuel injection event occurs when the crankshafts is at an optimum angular position. The method described herein provides a new, unique process for calculating the angular position of the crankshaft at the occurrence of the fuel injection event, which requires the engine controller to make fewer computations then other known methods. Reducing the number of computations, as well changing the type of processes that the engine controller must perform to calculate the angular position of the crankshaft at the occurrence of the fuel injection event, reduces the processing time for the engine controller, which enables the engine controller to perform other important calculations and/or processes, thereby improving the operation of the engine controller, and the internal combustion engine.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
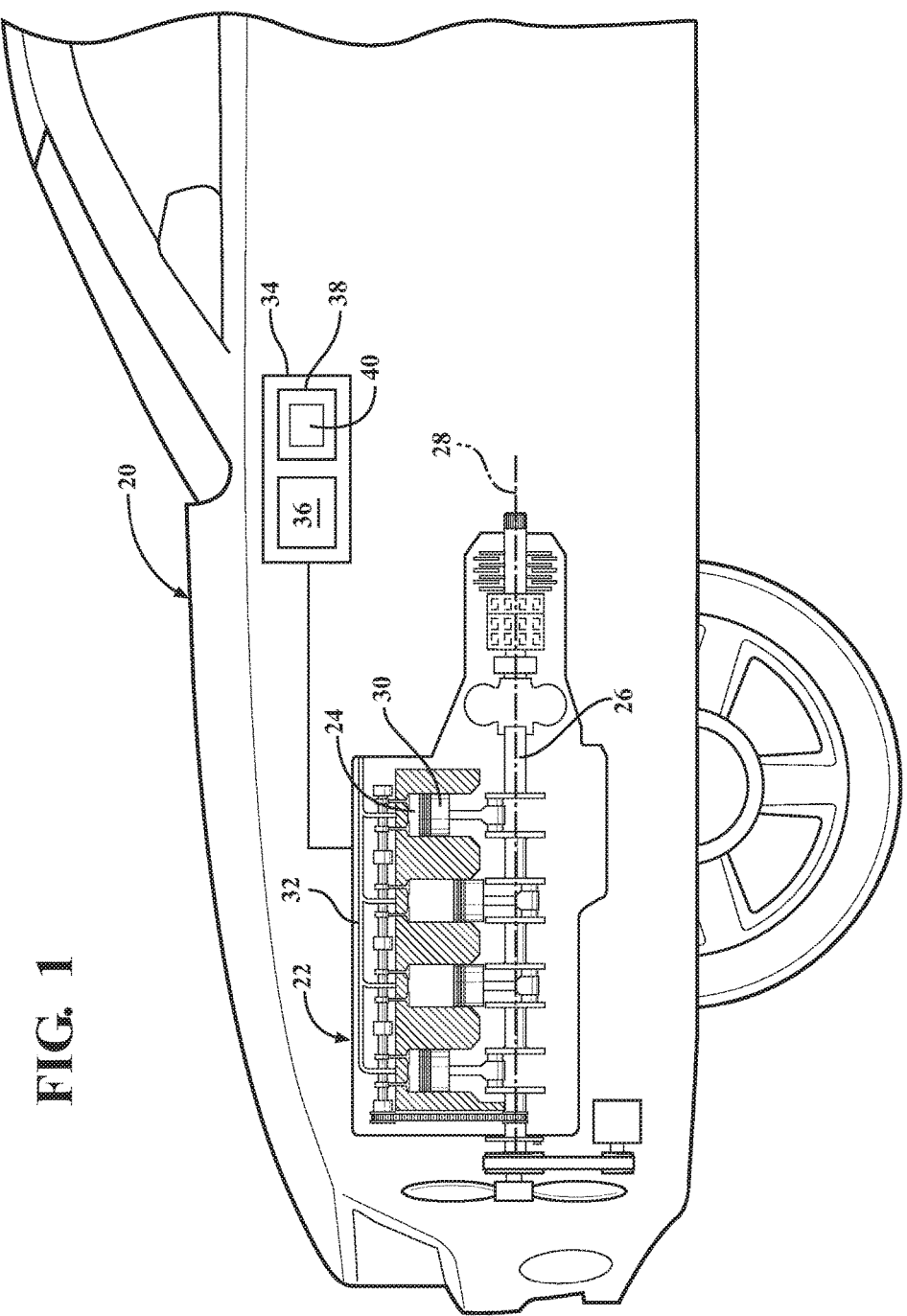
FIG. 1 is a schematic side cross sectional view of a vehicle.

Referring to the FIGS., wherein like numerals indicate like parts throughout the several views, a vehicle is generally shown at 20 in FIG. 1. Referring to FIG. 1, the vehicle 20 may include any type of moveable platform that includes an internal combustion engine 22. For example, the vehicle 20 may include, but is not limited to, a car, truck, motorcycle, ATV, tractor, airplane, etc. The internal combustion engine 22 may include any type and/or configuration of engine. For example, the internal combustion engine 22 may include, but is not limited to, a gasoline engine or a diesel engine. Additionally, the internal combustion engine 22 may be configured as, but is not limited to, a rotary engine, an inline engine, or a V-type engine. The internal combustion engine 22 includes at least one cylinder 24, and a crankshaft 26 that rotates about a crank axis 28. As is known in the art, a piston 30 is connected to the crankshaft 26 via a connecting rod, and moves in a reciprocating motion within the cylinder 24. It should be appreciated that the internal combustion engine 22 may include any number of cylinders 24 and pistons 30, e.g., 1, 2, 3, 4, etc. The internal combustion engine 22 includes a fuel rail 32 that supplies pressurized fuel to the cylinder(s) 24. The specific type, configuration, and operation of the internal combustion engine 22 is not pertinent to the teachings of the disclosure, are well known to those skilled in the art, and are therefore not described in detail herein.

The vehicle 20 further includes an engine controller 34 for controlling the operation of the internal combustion engine 22. The engine controller 34 may alternatively be referred to as a controller, a vehicle controller, a specialized computer, an Engine Control Unit (ECU), an Engine Control Module (ECM), etc. The engine controller 34 may include a computer and/or processor, and include all software, hardware, memory, algorithms, connections, sensors, etc., necessary to manage and control the operation of the internal combustion engine 22. As such, a method, described below, may be embodied as a program or algorithm that is operable on the engine controller 34. It should be appreciated that the engine controller 34 may include any device capable of analyzing data from various sensors, comparing data, making the necessary decisions required to control the operation of the internal combustion engine 22, and executing the required tasks necessary to control the operation of the internal combustion engine 22.

The engine controller 34 may be embodied as one or multiple digital computers or host machines each having one or more processors 36, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The engine controller 34 includes tangible, non-transitory memory 38 on which are recorded computer-executable instructions, including a crankshaft angular position calculation algorithm 40. The processor 36 of the engine controller 34 is configured for executing the crankshaft angular position calculation algorithm 40. The crankshaft angular position calculation algorithm 40 implements a method of controlling the internal combustion engine 22 of the vehicle 20. As part of the method of controlling the internal combustion engine 22, the crankshaft angular position calculation algorithm 40 implements a method of calculating the angular position of the crankshaft 26 at the occurrence of a fuel injection event, which the engine controller 34 may then use to control a timing of a future fuel injection event.

The method of controlling the internal combustion engine 22 includes continuously sensing the fuel pressure within the fuel rail 32 of the internal combustion engine 22 during rotation of the crankshaft 26 to define a fuel pressure data stream 42. The fuel pressure in the fuel rail 32 may be sensed in any suitable manner, including but not limited to one or more pressure sensors connected to the fuel rail 32. The fuel pressure in the fuel rail 32 may be communicated to the engine controller 34, and saved in the memory 38 of the engine controller 34. The continuous monitoring of the fuel pressure in the fuel rail 32 defines the fuel pressure data stream 42, which may be defined as the fuel pressure in the fuel rail 32 during a period of time in which the crankshaft 26 is rotating.

Figure 2:
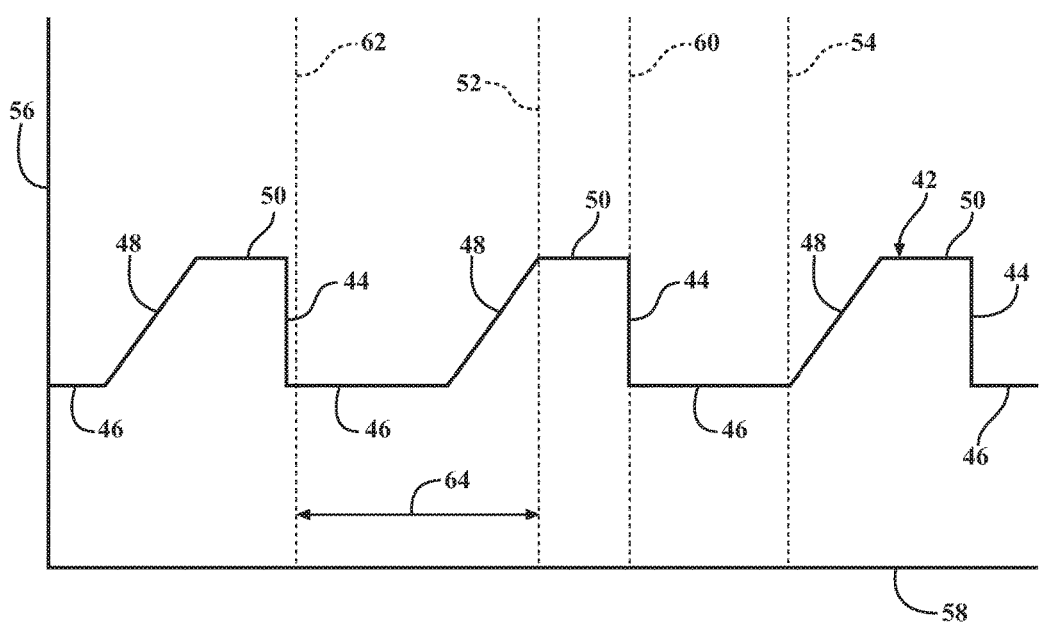
FIG. 2 is a schematic graph showing a fuel pressure data stream relative to an angular position of a crankshaft.

The fuel pressure data stream 42 is a continuous function of the fuel pressure within the fuel rail 32 as the crankshaft 26 rotates. Referring to FIG. 2, a fuel pressure of the fuel pressure data stream 42 is generally represented along a vertical axis 56, and an angular rotation of the crankshaft 26 is generally represented along a horizontal axis 58. As shown in FIG. 2, the fuel pressure data stream 42 forms a continuous line, generally shown at 42. At every fuel injection event in which fuel is injected into one of the engine cylinders 24, the fuel pressure within the fuel rail 32 drops to a generally constant post-injection fuel pressure 46. The fuel pressure drops 44 are represented by the generally vertical line segments 44 in the fuel pressure data stream 42. The post-injection fuel pressure 46 is generally represented by the horizontal line segments 46 in the fuel pressure data stream 42. After each fuel pressure drop 44, i.e., each fuel injection event, the fuel pressure within the fuel rail 32 increases to a substantially constant pre-injection pressure. The increase in the fuel pressure, from the post-injection fuel pressure 46 to the pre-injection fuel pressure 50, is generally represented by the inclined line segments 48 in the fuel pressure data stream 42. The pre-injection fuel pressure 50 is generally represented by the horizontal line segments 50 in the fuel pressure data stream 42. The cycle repeats itself for every fuel injection event.

Once the fuel pressure data stream 42 has been defined by continuously sensing the fuel pressure in the fuel rail 32 as the crankshaft 26 rotates, the engine controller 34 may identify a pressure drop 44 in the fuel pressure data stream 42. Any of the pressure drops 44 in the fuel pressure data stream 42 may be selected or identified. As noted above, the pressure drop 44 in the fuel pressure data stream 42 occurs at a fuel injection event. Accordingly, by determining the angular position of the crankshaft 26 when the fuel pressure in the fuel rail 32 drops, the engine controller 34 may determine the angular position of the crankshaft 26 when fuel is injected into the engine cylinders 24.

In order to calculate the angular position of the crankshaft 26 at the pressure drop 44 identified in the fuel pressure data stream 42, the engine controller 34 integrates a pair of equations between a period start position 52 and a period end position 54 in the fuel pressure data stream 42. The engine controller 34 defines the period start position 52 in the fuel pressure data stream 42 at a location prior to the identified pressure drop 44. The period start position 52 should be defined so that the fuel pressure data stream 42 maintains the substantially constant pre-injection fuel pressure 50 between the period start position 52 and the identified pressure drop 44 in the fuel pressure data stream 42. Accordingly, the period start position 52 should not extend into the inclined segment 48 of the fuel pressure data stream 42 representing the increase in fuel pressure from the post-injection fuel pressure 46 to the pre-injection fuel pressure 50.

The engine controller 34 defines the period end position 54 in the fuel pressure data stream 42 at a location subsequent to or after the identified pressure drop 44. The period end position 54 should be defined so that the fuel pressure data stream 42 maintains the substantially constant post-injection fuel pressure 46 between the identified pressure drop 44 in the fuel pressure data stream 42 and the period end position 54. Accordingly, the period end position 54 should not extend into the inclined segment 48 of the fuel pressure data stream 42 representing the increase in fuel pressure from the post-injection fuel pressure 46 to the pre-injection fuel pressure 50. Accuracy of the calculation is increased by defining the period start position 52 and the period end position 54 as far apart from each other along the horizontal axis 58 as possible, without the period start position 52 or the period end position 54 including any portion of the inclined segments 48 of the fuel pressure data stream 42 indicating the pressure increase in the fuel rail 32.

As noted above, the engine controller 34 integrates a first polynomial function $L_1$ and a second polynomial function $L_2$ between the period start position 52 and the period end position 54. The period start position 52 in the fuel pressure data stream 42 is the lower limit of the integration of the first polynomial function $L_1$ and the second polynomial function $L_2$, and is defined to include a value equal to zero. The period end position 54 in the fuel pressure data stream 42 is the upper limit of the integration of the first polynomial function $L_1$ and the second polynomial function $L_2$, and is defined to include a value equal to $2\pi$.

The first polynomial function $L_1$ is defined by Equation 1.

$$L_1 = \int_0^{2\pi} P(\theta) \cdot (2\theta - 2\pi) d\theta; \qquad 1)$$

Within Equation 1, $P(\theta)$ is the fuel pressure data stream 42 within the fuel rail 32 of the internal combustion engine 22 relative to the angular position of the crankshaft 26 during a fuel injection event, and $\theta$ is the angular position of the crankshaft 26.

The second polynomial function $L_2$ is defined by Equation 2.

$$L_2 = \int_0^{2\pi} P(\theta) \cdot (3\theta^2 - 4\pi\theta) d\theta \qquad 2)$$

Within Equation 2, $P(\theta)$ is the fuel pressure data stream 42 within the fuel rail 32 of the internal combustion engine 22 relative to the angular position of the crankshaft 26 during a fuel injection event, and $\theta$ is the angular position of the crankshaft 26.

The engine controller 34 calculates the angular position of the crankshaft 26 of the internal combustion engine 22 at the occurrence of a fuel injection event by dividing the integrated second polynomial function by the integrated first polynomial function. Accordingly, the engine controller 34 calculates the angular position of the crankshaft 26 at the occurrence of the identified or previous fuel injection event from Equation 3.

$$\gamma_{inj} = \frac{L_2}{L_1} \qquad 3)$$

Within Equation 3, $\gamma_{inj}$ is the angular position of the crankshaft 26 at the occurrence of the identified fuel injection event, and is generally shown in FIG. 2 by reference line 60, $L_1$ is the integration of the first polynomial function, and $L_2$ is the integration of the second polynomial function. It should be appreciated that since the angular position of the crankshaft 26 was calculated based on the defined period start position 52 and the defined period end position 54, that the calculated angular position of the crankshaft 26 ($\gamma_{inj}$ 60) is relative to the period start position 52 and the period end position.

After the engine controller 34 has calculated the angular position of the crankshaft 26 at the occurrence of the identified fuel injection event, (i.e., $\gamma_{inj}$ 60) the engine controller 34 may then correlate the calculated angular position of the crankshaft 26 at the occurrence of the previous or identified fuel injection event to an absolute position of the crankshaft 26 during an engine cycle, relative to a Top Dead Center (TDC) position 62 of the crankshaft 26. The TDC position 62 of the crankshaft 26 may be defined as the TDC of a specific one of the engine cylinders 24 of the internal combustion engine 22. However, the TDC position 62 of the crankshaft 26 may be defined to include some other rotational position of the crankshaft 26.

The engine controller 34 may correlate the calculated angular position of the crankshaft 26 to the absolute position of the crankshaft 26 by calculating the absolute angular position of the crankshaft 26 at the occurrence of the previous fuel injection event from Equation 4.

$$\gamma_{abs} = \gamma_{inj}\left(\frac{z}{2\pi}\right) + \gamma_{offset} \qquad 4)$$

Within Equation 4, $\gamma_{abs}$ is the absolute position of the crankshaft 26 at the occurrence of the previous or identified fuel injection event relative to the TDC position 62, $\gamma_{inj}$ is the calculated angular position of the crankshaft 26 at the occurrence of the previous fuel injection event, z=angular rotation of the crankshaft 26 that occurs between the period start position 52 and the period end position 54, and $\gamma_{offset}$ is the angular rotation of the crankshaft 26 between the TDC position 62 of the crankshaft 26 and the period start position 52 of the fuel pressure data stream 42. The angular rotation of the crankshaft 26 between the TDC position 62 of the crankshaft 26 and the period start position 52 of the fuel pressure data stream 42, i.e., $\gamma_{offset}$, is represented by the dimension line 64 in FIG. 2. Referring to FIG. 2, it should be appreciated that the absolute position of the crankshaft 26 at the occurrence of the previous or identified fuel injection event relative to the TDC position 62 and the calculated angular position $\gamma_{inj}$ 60 of the crankshaft 26 at the occurrence of the previous fuel injection event include the same location shown in the graph of FIG. 2, the difference being that the calculated angular position $\gamma_{inj}$ 60 of the crankshaft 26 at the occurrence of the previous fuel injection event is defined or based on the period start position 52, whereas the absolute position of the crankshaft 26 at the occurrence of the previous fuel injection event is relative to the TDC position 62.

The engine controller 34 may then adjust the operation or control of the internal combustion engine 22 based on the calculated position of the crankshaft 26 at the occurrence of the fuel injection event. As noted above, due to wear of a fuel injector, the timing or time delay between a control signal and the actual injection of the fuel into the engine cylinder 24 may change when the fuel is injected into the cylinder 24 bore relative to the angular position of the crankshaft 26, thereby changing the position of the piston 30 in the engine cylinder 24 during combustion. Accordingly, by calculating the rotational position of the crankshaft 26 at the occurrence of a previous fuel injection event, the engine controller 34 may determine if the fuel injection event is occurring when the crankshaft 26 and the piston 30 are in the optimal position for combustion. If the engine controller 34 determines that the angular position of the crankshaft 26 at the occurrence of a previous fuel injection event is not at a desired or optimal angular position, then the engine controller 34 may adjust the timing of the fuel injection control signal so that a future fuel injection event does occur at the desired angular position of the crankshaft 26.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A method of controlling an internal combustion engine, the method comprising:
   calculating an angular position of a crankshaft of the internal combustion engine at the occurrence of a previous fuel injection event, with an engine controller, from the equation $$\gamma_{inj} = \frac{L_2}{L_1};$$

wherein $\gamma_{inj}$ is the angular position of the crankshaft at the occurrence of the previous fuel injection event, $L_2 = \int_0^{2\pi} P(\theta) \cdot (3\theta^2 - 4\pi\theta) d\theta$, $L_1 = \int_0^{2\pi} P(\theta) \cdot (2\theta - 2\pi) d\theta$, $P(\theta)$ is a fuel pressure data stream within a fuel rail of the internal combustion engine relative to the angular position of the crankshaft during the previous fuel injection event, and $\theta$ is the angular position of the crankshaft; and
   adjusting a fuel injection timing of a future fuel injection event, with the engine controller, based on the calculated angular position of the crankshaft at the occurrence of the previous fuel injection event, so that the future fuel injection event occurs at a desired angular position of the crankshaft.

2. The method set forth in claim 1, further comprising continuously sensing the fuel pressure within the fuel rail of the internal combustion engine during rotation of the crankshaft to define the fuel pressure data stream.

3. The method set forth in claim 1, further comprising identifying a pressure drop in the fuel pressure data stream.

4. The method set forth in claim 3, further comprising defining a period start position in the fuel pressure data stream prior to the identified pressure drop, wherein the fuel pressure data stream maintains a substantially constant pre-injection fuel pressure between the period start position and the identified pressure drop in the fuel pressure data stream.

5. The method set forth in claim 4, further comprising defining a period end position in the fuel pressure data stream subsequent to the identified pressure drop, wherein the fuel pressure data stream maintains a substantially constant post-injection fuel pressure between the identified pressure drop in the fuel pressure data stream and the period end position.

6. The method set forth in claim 5, further comprising correlating the calculated angular position of the crankshaft at the occurrence of the previous fuel injection event to an absolute position of the crankshaft during an engine cycle relative to a Top Dead Center (TDC) position of the crankshaft.

7. The method set forth in claim 6, wherein correlating the calculated angular position of the crankshaft to the absolute position of the crankshaft includes calculating the absolute angular position of the crankshaft at the occurrence of the previous fuel injection event from the equation:

$$\gamma_{abs} = \gamma_{inj}\left(\frac{z}{2\pi}\right) + \gamma_{offset};$$

wherein $\gamma_{abs}$ is the absolute position of the crankshaft at the occurrence of the previous fuel injection event, $\gamma_{inj}$ is the calculated angular position of the crankshaft at the occurrence of the previous fuel injection event, z=angular rotation of the crankshaft that occurs between the period start position and the period end position, and $\gamma_{offset}$ is the angular rotation of the crankshaft from the TDC position of the crankshaft and the period start position of the fuel pressure data stream.

8. A method of calculating an angular position of a crankshaft at the occurrence of a fuel injection event, the method comprising:
   integrating a first polynomial function $L_1 = \int_0^{2\pi} P(\theta) \cdot (2\theta - 2\pi) d\theta$;
   integrating a second polynomial function $L_2 = \int_0^{2\pi} P(\theta) \cdot (3\theta^2 - 4\pi\theta) d\theta$;
   wherein $P(\theta)$ is a fuel pressure data stream within a fuel rail of the internal combustion engine relative to the angular position of the crankshaft during the previous fuel injection event, and $\theta$ is the angular position of the crankshaft; and
   dividing the integrated second polynomial function by the integrated first polynomial function to calculate the angular position of the crankshaft at the occurrence of the fuel injection event.

9. The method set forth in claim 8, further comprising continuously sensing the fuel pressure within the fuel rail of an internal combustion engine during rotation of the crankshaft to define the fuel pressure data stream.

10. The method set forth in claim 8, further comprising identifying a pressure drop in the fuel pressure data stream.

11. The method set forth in claim 10, further comprising defining a period start position in the fuel pressure data stream prior to the identified pressure drop, wherein the fuel pressure data stream maintains a substantially constant pre-injection fuel pressure between the period start position and the identified pressure drop in the fuel pressure data stream.

12. The method set forth in claim 11, wherein the period start position in the fuel pressure data stream is the lower limit of the integration of the first and second polynomial functions, and is defined to equal zero.

13. The method set forth in claim 11, further comprising defining a period end position in the fuel pressure data stream subsequent to the identified pressure drop, wherein the fuel pressure data stream maintains a substantially constant post-injection fuel pressure between the identified pressure drop in the fuel pressure data stream and the period end position.

14. The method set forth in claim 13, wherein the period end position in the fuel pressure data stream is the upper limit of the integration of the first and second polynomial functions, and is defined to equal $2\pi$.

15. The method set forth in claim 13, further comprising correlating the calculated angular position of the crankshaft at the occurrence of the fuel injection event to an absolute position of the crankshaft during an engine cycle relative to a Top Dead Center (TDC) position of the crankshaft.

16. The method set forth in claim 15, wherein correlating the calculated angular position of the crankshaft to the absolute position of the crankshaft includes calculating the absolute angular position of the crankshaft at the occurrence of the previous fuel injection event from the equation:

$$\gamma_{abs} = \gamma_{inj}\left(\frac{z}{2\pi}\right) + \gamma_{offset};$$

wherein $\gamma_{abs}$ is the absolute position of the crankshaft at the occurrence of the fuel injection event, $\gamma_{inj}$ is the calculated angular position of the crankshaft at the occurrence of the previous fuel injection event, z=angular rotation of the crankshaft that occurs between the period start position and the period end position, and $\gamma_{offset}$ is the angular rotation of the crankshaft from the TDC position of the crankshaft and the period start position of the fuel pressure data stream.

17. A vehicle comprising:
an internal combustion engine having at least one cylinder and a crankshaft that is rotatable about a crank axis;
a fuel rail for supplying pressurized fuel to each of the at least one cylinder; and
an engine controller including a processor and a tangible, non-transitory memory, on which is recorded computer-executable instructions, including a crankshaft angular position calculation algorithm, wherein the processor is operable to execute the crankshaft angular position calculation algorithm to:
calculate an angular position of the crankshaft at the occurrence of a fuel injection event, from the equation $$\gamma_{inj} = \frac{L_2}{L_1},$$

wherein $\gamma_{inj}$ is the angular position of the crankshaft at the occurrence of the previous fuel injection event, $L_2 = \int_0^{2\pi} P(\theta) \cdot (3\theta^2 - 4\pi\theta)d\theta$, $L_1 = \int_0^{2\pi} P(\theta) \cdot (2\theta - 2\pi)d\theta$, $P(\theta)$ is a fuel pressure data stream within a fuel rail of the internal combustion engine relative to the angular position of the crankshaft during the previous fuel injection event, and $\theta$ is the angular position of the crankshaft.

18. The vehicle set forth in claim 17, wherein the processor is operable to execute the crankshaft angular position calculation algorithm to adjust a fuel injection timing of a future fuel injection event, based on the calculated angular position of the crankshaft at the occurrence of the previous fuel injection event, so that the future fuel injection event occurs at a desired angular position of the crankshaft.

19. The vehicle set forth in claim 17, wherein the processor is operable to execute the crankshaft angular position calculation algorithm to:
identify a pressure drop in the fuel pressure data stream;
define a period start position in the fuel pressure data stream prior to the identified pressure drop, wherein the fuel pressure data stream maintains a substantially constant pre-injection fuel pressure between the period start position and the identified pressure drop in the fuel pressure data stream; and
define a period end position in the fuel pressure data stream subsequent to the identified pressure drop, wherein the fuel pressure data stream maintains a substantially constant post-injection fuel pressure between the identified pressure drop in the fuel pressure data stream and the period end position.

20. The vehicle set forth in claim 19, wherein the processor is operable to execute the crankshaft angular position calculation algorithm to:
calculate an absolute angular position of the crankshaft at the occurrence of the previous fuel injection event, relative to a Top Dead Center (TDC) position of the crankshaft, from the equation:

$$\gamma_{abs} = \gamma_{inj}\left(\frac{z}{2\pi}\right) + \gamma_{offset};$$

wherein $\gamma_{abs}$ is the absolute position of the crankshaft at the occurrence of the previous fuel injection event, $\gamma_{inj}$ is the calculated angular position of the crankshaft at the occurrence of the previous fuel injection event, z=angular rotation of the crankshaft that occurs between the period start position and the period end position, and $\gamma_{offset}$ is the angular rotation of the crankshaft from the TDC position of the crankshaft and the period start position of the fuel pressure data stream.

* * * * *